United States Patent [19]

Michalak et al.

[11] 3,851,222

[45] Nov. 26, 1974

[54] PRINTED WIRING CARD STIFFENER BRACKET

[75] Inventors: Bogumil M. Michalak, Melrose Park; Ansano Bertellotti, Addison, both of Ill.

[73] Assignee: GTE Automatic Electric Laboratories, Incorporated, Northlake, Ill.

[22] Filed: Dec. 17, 1973

[21] Appl. No.: 425,440

[52] U.S. Cl. .................... 317/101 R, 317/101 DH
[51] Int. Cl. .......................................... H02b 1/02
[58] Field of Search ..... 317/101 R, 101 C, 101 DH; 339/17 L, 17 LM, 17 C; 211/41

[56] References Cited

UNITED STATES PATENTS

| | | | |
|---|---|---|---|
| 2,945,989 | 7/1960 | Vogel et al | 317/101 DH |
| 3,052,821 | 9/1962 | Scoville | 317/101 R |
| 3,303,394 | 2/1967 | Peter et al | 317/101 DH |
| 3,614,540 | 10/1971 | Slusser | 317/101 DH |

FOREIGN PATENTS OR APPLICATIONS

| | | | |
|---|---|---|---|
| 1,195,829 | 7/1965 | Germany | 317/101 DH |

*Primary Examiner*—David Smith, Jr.
*Attorney, Agent, or Firm*—James V. Lapacek; Robert F. Van Epps

[57] ABSTRACT

A printed wiring card stiffener bracket including a handle portion and two extending arms having novel tab arrangements that engage and secure both sides of the printed wiring card for preventing card distortion and for assisting in the insertion of the card in a card file.

11 Claims, 3 Drawing Figures

PRINTED WIRING CARD STIFFENER BRACKET

BACKGROUND OF THE INVENTION

1. Field of the Invention

The present invention relates generally to the field of supporting and strengthening printed circuit boards and more particularly to a new and novel printed wiring card stiffener bracket having tab arrangements for engaging and securing both sides of the printed wiring card.

2. Description of the Prior Art

Large dimensioned printed wiring cards are subject to warpage and linear distortion once they are equipped with fairly heavy components and automatically soldered. Such distortion and warpage makes it difficult if not impossible to insert the card into a card file and also to mate properly with a respective connector. To avoid such linear distortion and warpage and also to assist in the insertion of the card, a stiffener frame or bracket is necessary. Many support structures of the prior art such as U.S. Pat. No. 3,216,580 which issued to F. V. Fricker Jr., on Nov. 9, 1965, U.S. Pat. No. 3,539,879 which issued to A. W. Bradley et al. on Nov. 10, 1970 and Swiss Pat. No. 377,902 utilize a grooved warp around frame. Such arrangements are normally unsuitable since the support structures either form a portion of the connector or the card file support frame and either interfere with the use of a printed wiring card in normal card file structures or do not provide adequate support due to the tolerances required to allow sliding of the card. Another structure of the prior art disclosed in German Pat. No. 1,195,829 utilizes a frame type stiffener which supports the entire perimeter of the printed wiring card having engaging tabs which fit through the printed wiring card which are bent over on the opposite side of the card. Such an arrangement is normally unsuitable due to the excessive land areas required by the stiffener frame and the inconsistencies inherent in bending tabs to provide support. The prior art printed circuit board connector assembly disclosed in U.S. Pat. No. 3,200,361 which issued to L. Schwartz et al. on Aug. 10, 1965 utilizes a plurality of opposing cleats along the edge of the frame contacting the printed wiring card with the card sliding between the opposing cleats. Such an arrangement however is unsuitable because adequate support to prevent distortion and warpage is not provided in a structure where the card slides between the support structures.

OBJECTS AND SUMMARY OF THE INVENTION

Accordingly it is a principle object of the present invention to provide a printed wiring card stiffener bracket including tab arrangements for engaging and securing both sides of the printed wiring card.

Another object is a printed wiring card stiffener bracket with a minimum of interference with the land area of the printed wiring card.

Another object is a printed wiring card stiffener bracket that may be utilized with standard card files and connector arrangements without interference between the structures.

Another object is a printed wiring card stiffener bracket which allows clearance between the printed wiring card and the stiffener assembly for maximum cooling efficiency.

Another object is a printed wiring card stiffener bracket which provides for minimum loss of component area of the printed wiring card.

Another object is a printed wiring card stiffener bracket which is adapted to receive an extractor tool for card removal from a card file.

Another object is a printed wiring card stiffener bracket which is adapted to accept a magnetic shield where required.

These and other objectives of the present invention are achieved by providing a printed wiring card stiffener bracket which includes a handle portion and two extending blade arm portions which correspond to the dimensions of the printed wiring card to be supported. Tab arrangements are provided along the blade arms that are positioned through slots in the printed wiring card which are then guided into position by sliding; thereby providing support by engaging and securing both sides of the printed wiring card. After the tabs have engaged the printed wiring card surfaces, the handle portion is then attached to the printed wiring cards by suitable mounting means.

Other objects will appear from time to time in the ensuing specification, drawings and claims.

DESCRIPTION OF THE PREFERRED EMBODIMENT

Figure 1:
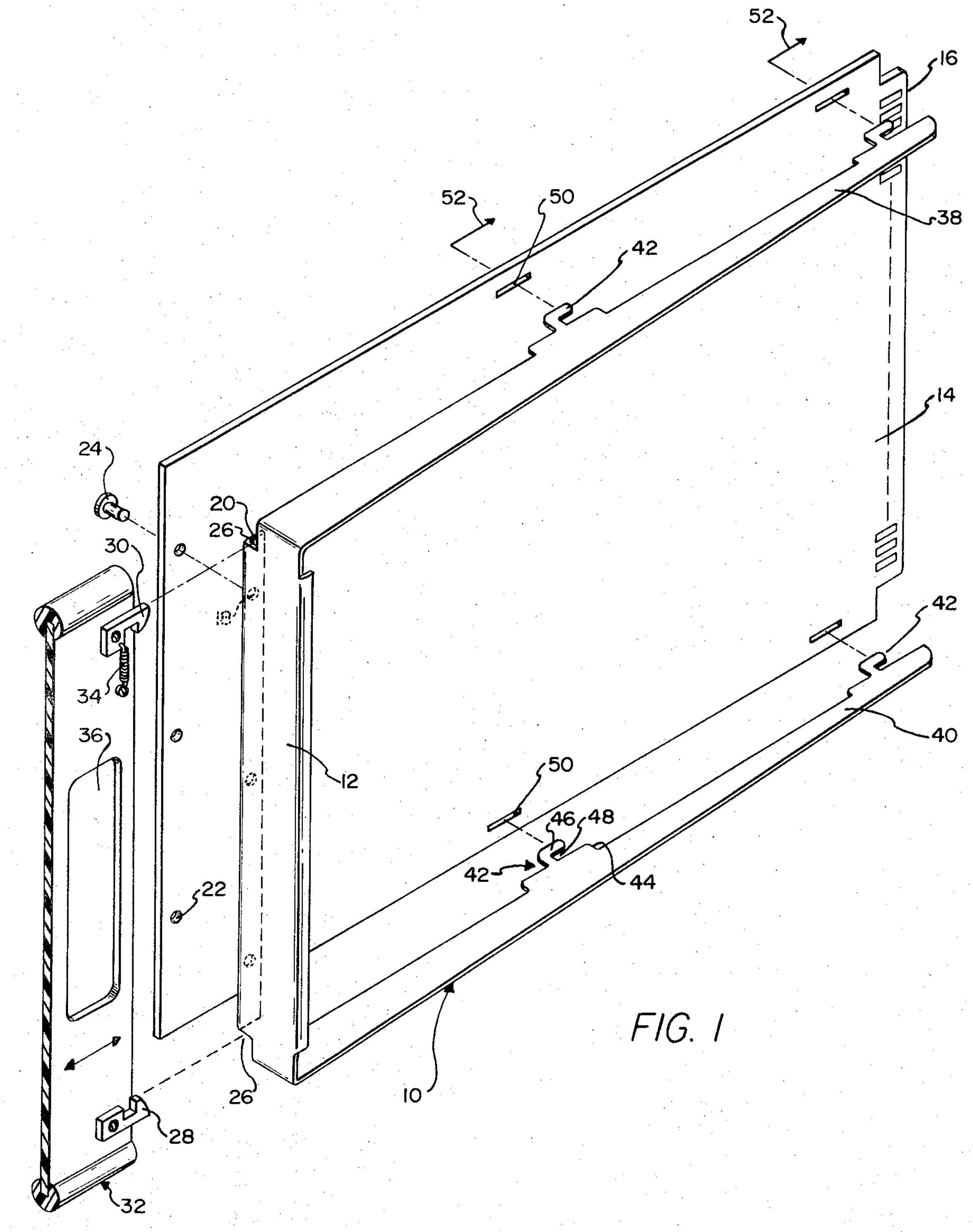
FIG. 1 is a perspective view of the printed wiring card stiffener bracket of the present invention in position to be attached to the printed wiring card.
Figure 2:
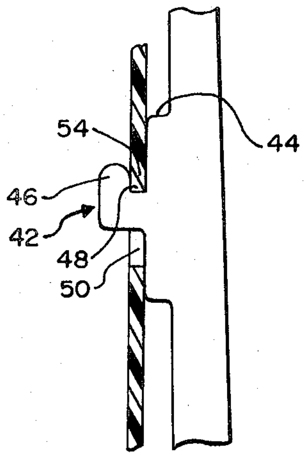
FIG. 2 is a partial edge view of the printed wiring card and a partial view of the printed wiring card stiffener bracket of the present invention illustrating the novel tab arrangements.
Figure 3:
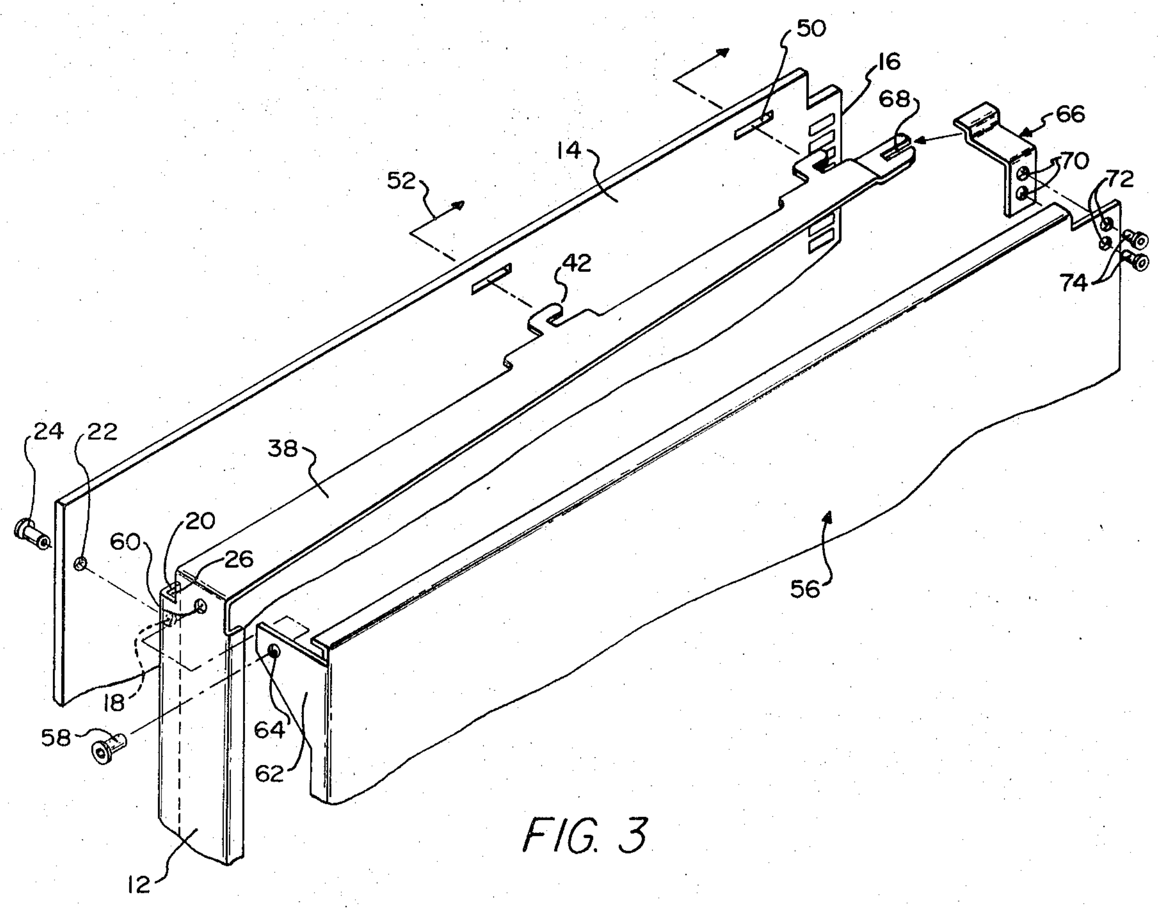
FIG. 3 is a partial perspective view of the printed wiring card stiffener bracket illustrating the adaptability to mount a magnetic shield.

The printed wiring card stiffener bracket 10 illustrated in FIGS. 1 through 3 includes a handle portion 12 which is approximately the width of the printed circuit card 14 which is the edge opposite the connector portion 16 of the printed wiring card 14. A number of holes 18 are located along a bottom ledge 20 of the handle portion 12 that are in alignment with a similar number of holes 22 in a printed wiring card 14. A rivet 24 or other suitable connecting device is inserted through the printed wiring card and the hole 18 of flange 20 with the rivet then being fastened so as to secure the stiffener bracket 10 to the printed wiring card 14 as will be explained in detail hereinafter. Side cutouts 26 are formed at each end of the handle portion 12 that are adapted to receive tabs 28 and 30 of a standard extractor tool 32. The extractor tool 32 has one tab 28 fix mounted and the other tab 30 spring mounted by spring 34 to allow engagement of the tabs 28 and 30 in cutouts 26. The extractor tool is then withdrawn carrying the stiffener bracket 10 and printed wiring card 14 assembly for removal from a card or file rack. A hand opening 36 is provided in the extractor tool 32 to allow easy grasping by the fingers or hands during extraction.

Extending from each end of the handle portion 12 and substantially perpendicular are blade arm portions 38 and 40 of the stiffener bracket 10 which are adapted to be in alignment with the edges of the printed wiring card 14 along its length. At intervals along the blade arm portions 38 and 40, for example every 5 inches along a 13 inch printed wiring card, extending tabs 42 are provided which include a first extending rectangular portion 44 and an L-shaped portion 46 which protrudes from the portion 44. A slot 48 is formed between the extending portions 44 and 46 whose function will be explained in detail hereinafter. Rectangular shaped slots 50 are formed in the printed wiring card along the edges corresponding to the tabs 42 of the arms 40 and 38. These slots may be approximately one half of an inch in length for a 13 inch printed wiring card. The length of the slots 50, as best seen in FIG. 2, is slightly greater than the length of the protruding L-shaped portion 46 of the tab 42 so that the protruding portion 46 of tab 42 may be inserted through the slot 50 of the printed wiring card 14. The printed wiring card stiffener bracket 10 may be formed from aluminum or other suitable metal having the desired characteristics of tencil strength and ridigity. While the present embodiment describes a stiffener bracket having arm portions and a handle portion formed of a continuous strip of material, it should be noted that various other fabrication techniques are also suitable. Therefore the stiffener bracket 10 may also be fabricated in three separate pieces with each arm 38, 40 being fabricated separately and attached at each end of the handle portion 12. The arm portions may then be connected to the handle portion by bolting, riveting or welding or might also include twist tabs or staking pins to connect to the handle.

To assemble the bracket 10 and printed wiring card 14, the stiffener bracket 10 is placed against the printed wiring card 14 allowing the tabs 42 to pass through slots 50 of the card 14. With the tabs 42 now extending below the surface of the printed wiring card 14, the bracket 10 is moved as shown by reference arrow 52 toward the connector edge 16 of the card 14 so that the printed wiring card is engaged by the slotted portion 48 of tabs 42 with a portion 54 of the printed circuit card being firmly retained between the extending portions 46 and 44 of the tab 42 as seen in FIG. 2. The edge surface of rectangular tab portion 44 is also in firm contact with the printed wiring card along its length. With the tabs now inserted and locking the stiffener bracket 10 to the printed wiring card 14, the handle portion 12 is now riveted to the card 14 by means of the rivet 24 and holes 18 and 22.

The stiffener bracket 10 may also be provided with a magnetic shield element 56 which is essentially a flat metal plate adapted to fit the stiffener bracket 10. The magnetic shield 56 attaches to the stiffener bracket 10 near the handle portion 12 by means of a screw 58 being placed through a hole 60 in the bracket 10 and through extending tabs 62 by means of holes 64. At the far end of the blade arms 38 and 40, the magnetic shield 56 is connected by means of a bracket 66 which is adapted to slide into a slotted portion 68 of the arms 38, 40. The bracket 66 is attached to the magnetic shield 56 through holes 70 in the bracket 66 and holes 72 in the magnetic shield 56 by means of rivet 74 or other suitable fastening means.

The printed wiring card stiffener bracket of the present invention provides support and rigidity to a printed wiring card by means of sliding tabs that engage and secure both sides of the card in order to prevent linear distortion and warpage as well as to assist in the insertion of the printed wiring card into a card file rack. The method of mounting the stiffener bracket 10 to the printed wiring card allows the edges of the printed wiring card to slide into standard card file guides without interference while the blade type construction of the stiffener bracket results in a minimum loss of component area and printed circuit card area. The printed wiring card stiffener bracket mounts to the printed wiring card with both surfaces of the card engaged between portions of the tabs extending from the bracket. The card is then forced by the locking tab to adhere to the elongated extending portions of the tabs for further support. The assembled stiffener bracket and printed wiring card then form an assembly of high strength which allows the carrying or handling of the assembly without strain to either part the bracket or card. The stiffener bracket is also adapted to receive a magnetic shield where required and an extractor tool for easy handling.

Whereas the preferred form in the invention has been shown and described herein it should be realized that there may be many modifications, substitutions and alterations thereto without departing from the teachings of this invention.

Having described what is new and novel and desired to secure by Letters Patent, what is claimed is:

1. A printed wiring card stiffener bracket, comprising:

a handle portion extending along the edge of the printed circuit card to be stiffened that is exposed when the card is inserted into a card file, said handle portion including means for mounting the handle portion to the printed wiring card, the printed wiring card including appropriate apertures formed therein in alignment with said mounting means; and blade arm portions extending substantially perpendicular from each end of said handle portion and along the edges of the printed circuit card that adjoins the handle portion edge, said blade arm portions including tab means for engaging said printed wiring card being disposed along said blade arm portions at intervals suitable to stiffen said printed circuit card and prevent warpage and linear distortion, said engaging tab means including a rectangular portion extending from said blade arm edge being adjacent the printed wiring card and an L-shaped portion extending from said rectangular tab portion so as to form a slot between said rectangular and L-shaped tab portions, said L-shaped portion adapted to extend through slots in the printed wiring card being of larger dimension that said L-shaped portions with said stiffener bracket being moved in a direction such that the printed wiring board is engaged by said engaging tab means with the printed wiring card portion adjacent the slot moving into said slot formed between said tab portions, said handle portion being mounted to said printed wiring board after said tab engaging means are in engagement with said printed wiring card surfaces.

2. The printed wiring card stiffener bracket as recited in claim 1 wherein said rectangular tab portions and said L-shaped portions of said tab engaging means are adapted to be engagement with said printed wiring card such that the entire length of said rectangular tab portions engage the directly adjacent services of said printed wiring card.

3. The printed wiring card stiffener bracket as recited in claim 2 wherein said handle portion includes cut away portions at each end of said handle portion adapted to receive the extractor arms of a conventional extractor tool.

4. The printed wiring card stiffener bracket as recited in claim 2 wherein said mounting means are rivets and said handle portion includes apertures aligned with the apertures of said printed wiring card, said printed wiring card and said handle portion being joined by a riveting operation.

5. The printed wiring card stiffener bracket as recited in claim 2 further characterized in that said handle portions and said arm portions are formed from a continuous piece of material.

6. The printed wiring card stiffener bracket as recited in claim 5 wherein said material is aluminum.

7. The printed wiring card stiffener bracket as recited in claim 2 further characterized by connecting means and wherein said handle portion and said arm portions are formed from separate pieces of material, said handle portion and said arm portions being joined by said connecting means.

8. The printed wiring card stiffener bracket as recited in claim 7 wherein said connecting means are screws.

9. The printed wiring card stiffener bracket as recited in claim 7 wherein said connecting means are rivets.

10. The printed wiring card stiffener bracket as recited in claim 7 wherein said connecting means are twist tabs carried by said arm portions.

11. The printed wiring card stiffener bracket as recited in claim 2 further including magnetic shield means adapted to attach to said handle portion and said arm portions, said magnetic shield means including a flat metal plate covering substantially the entire printed wiring card.

* * * * *